United States Patent
Chen et al.

(10) Patent No.: US 11,206,596 B2
(45) Date of Patent: Dec. 21, 2021

(54) METHOD AND APPARATUS FOR REDUCING INTERRUPTION OF BEAMING RECOVERY PROCEDURE IN A WIRELESS COMMUNICATION SYSTEM

(71) Applicant: ASUSTek Computer Inc., Taipei (TW)

(72) Inventors: Wei-Yu Chen, Taipei (TW); Jia-Hong Liou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/197,965

(22) Filed: Nov. 21, 2018

(65) Prior Publication Data

US 2019/0166539 A1 May 30, 2019

Related U.S. Application Data

(60) Provisional application No. 62/590,842, filed on Nov. 27, 2017.

(51) Int. Cl.
*H04W 36/36* (2009.01)
*H04W 36/00* (2009.01)
*H04W 36/06* (2009.01)
*H04W 36/30* (2009.01)

(52) U.S. Cl.
CPC ....... *H04W 36/36* (2013.01); *H04W 36/0088* (2013.01); *H04W 36/06* (2013.01); *H04W 36/305* (2018.08)

(58) Field of Classification Search
CPC ... H04W 36/36; H04W 36/305; H04W 36/06; H04W 36/0088
See application file for complete search history.

(56) References Cited

U.S. PATENT DOCUMENTS

| | | | |
|---|---|---|---|
| 8,369,209 B2 | 2/2013 | Zhang | |
| 8,873,522 B2 | 10/2014 | Meylan | |
| 2018/0110066 A1* | 4/2018 | Luo | H04W 72/0413 |
| 2018/0270689 A1* | 9/2018 | Akkarakaran | H04B 7/0639 |
| 2018/0287860 A1* | 10/2018 | Xia | H04L 5/0091 |
| 2018/0288756 A1* | 10/2018 | Xia | H04L 5/0023 |
| 2018/0302889 A1* | 10/2018 | Guo | H04W 72/046 |
| 2018/0367374 A1* | 12/2018 | Liu | H04L 5/0051 |
| 2019/0037423 A1* | 1/2019 | Yu | H04W 24/04 |
| 2019/0052339 A1* | 2/2019 | Zhou | H04B 7/0632 |
| 2019/0053294 A1* | 2/2019 | Xia | H04W 72/0413 |
| 2019/0053312 A1* | 2/2019 | Xia et al. | H04L 5/0023 |
| 2019/0058519 A1* | 2/2019 | Davydov | H04B 7/0695 |
| 2019/0075600 A1* | 3/2019 | Kwon | H04B 7/0695 |
| 2019/0082334 A1* | 3/2019 | Nagaraja | H04W 24/04 |
| 2019/0098655 A1* | 3/2019 | Shih | H04B 7/0617 |
| 2019/0166555 A1* | 5/2019 | Cheng | H04W 72/0446 |
| 2019/0253127 A1* | 8/2019 | Kang | H04B 7/088 |
| 2020/0274606 A1* | 8/2020 | Kang | H04B 7/0695 |
| 2020/0366531 A1* | 11/2020 | Choi | H04L 25/0226 |
| 2021/0204346 A1* | 7/2021 | Ye | H04B 7/00 |

\* cited by examiner

*Primary Examiner* — Redentor Pasia
(74) *Attorney, Agent, or Firm* — Skaar Ulbrich Macari, P.A.

(57) ABSTRACT

A method and apparatus are disclosed from the perspective of a UE (User Equipment). In one embodiment, the method includes triggering a beam recovery procedure. The method further includes using a first resource on a PUCCH (Physical Uplink Control Channel) channel to transmit a beam failure recovery request to a network. The method also includes receiving a response for the first beam failure recovery request, wherein the response is received within a first measurement gap.

20 Claims, 8 Drawing Sheets

METHOD AND APPARATUS FOR REDUCING INTERRUPTION OF BEAMING RECOVERY PROCEDURE IN A WIRELESS COMMUNICATION SYSTEM

CROSS-REFERENCE TO RELATED APPLICATIONS

The present Application claims the benefit of U.S. Provisional Patent Application Ser. No. 62/590,842 filed on Nov. 27, 2017, the entire disclosure of which is incorporated herein in its entirety by reference.

FIELD

This disclosure generally relates to wireless communication networks, and more particularly, to a method and apparatus for reducing interruption of beaming recovery procedure in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment). In one embodiment, the method includes triggering a beam recovery procedure. The method further includes using a first resource on a PUCCH (Physical Uplink Control Channel) channel to transmit a beam failure recovery request to a network. The method also includes receiving a response for the first beam failure recovery request, wherein the response is received within a first measurement gap.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TR 38.913 V14.1.0, "Study on Scenarios and Requirements for Next Generation Access Technologies"; TS 36.321 V14.3.0, "Evolved Universal Terrestrial Radio Access (E-UTRA); Medium Access Control (MAC) protocol specification"; TR 38.802 V14.1.0, "Study on New Radio Access Technology, Physical Layer Aspects"; R2-1707198, "Beam Recovery in NR", Nokia, Alcatel-Lucent Shanghai Bell; Final Report of 3GPP TSG RAN WG1 #86bis v1.0.0 (Lisbon, Portugal, 10-14 Oct. 2016); Final Report of 3GPP TSG RAN WG1 #87 v1.0.0 (Reno, USA, 14-18 Nov. 2016); Final Report of 3GPP TSG RAN WG1 #AH1_NR v1.0.0 (Spokane, USA, 16-20 Jan. 2017); Final Report of 3GPP TSG RAN WG1 #88 v1.0.0 (Athens, Greece, 13-17 Feb. 2017; Final Report of 3GPP TSG RAN WG1 #88bis v1.0.0 (Spokane, USA, 3-7 Apr. 2017); Final Report of 3GPP TSG RAN WG1 #89 v1.0.0 (Hangzhou, China, 15-19 May 2017); Final Report of 3GPP TSG RAN WG1 #AH_NR2 v1.0.0 (Qingdao, China, 27-30 Jun. 2017); Final Chairman's Note of 3GPP TSG RAN WG1 Meeting #90 (Prague, Czech Republic, 21-25 Aug. 2017); Final Chairman's Note of 3GPP TSG RAN WG1 Meeting #AH_NR3 (Nagoya, Japan, 18-21 Sep. 2017); and Final Chairman's Note of 3GPP TSG RAN WG1 Meeting #90bis (Prague, CZ, 9-13 Oct. 2017) (updated with email approvals). The standards and documents listed above are hereby expressly incorporated by reference in their entirety.

Figure 1:
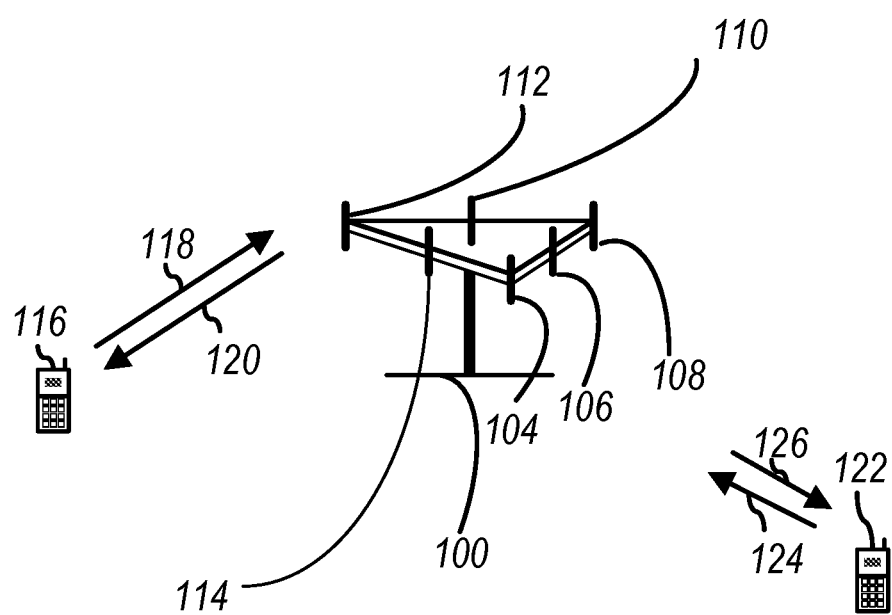
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
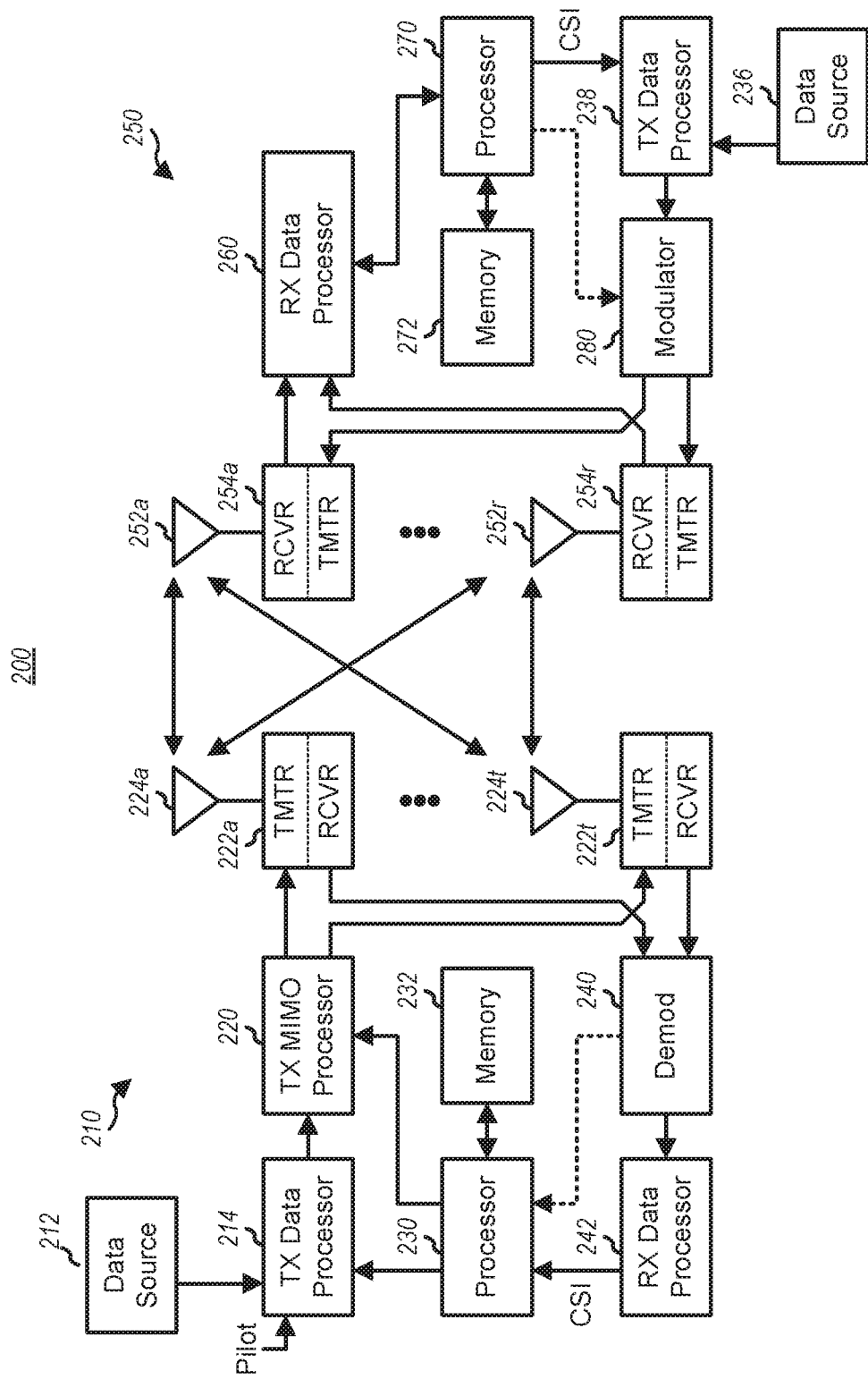
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
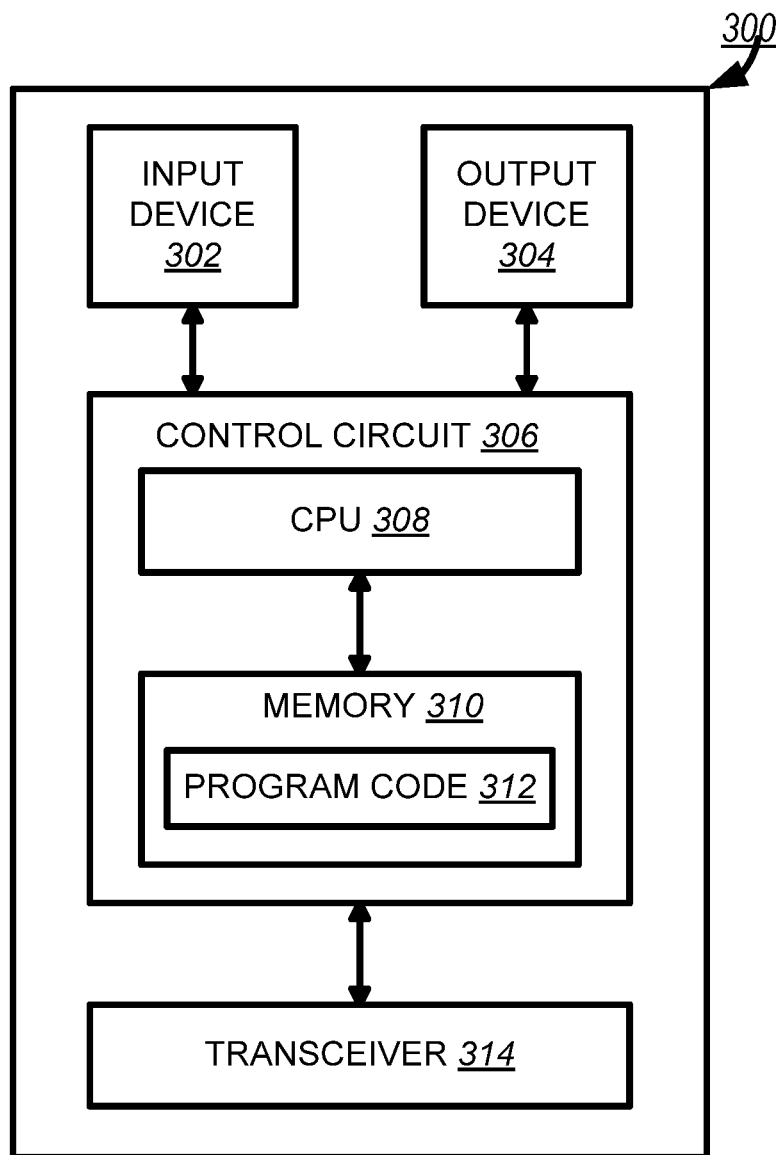
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
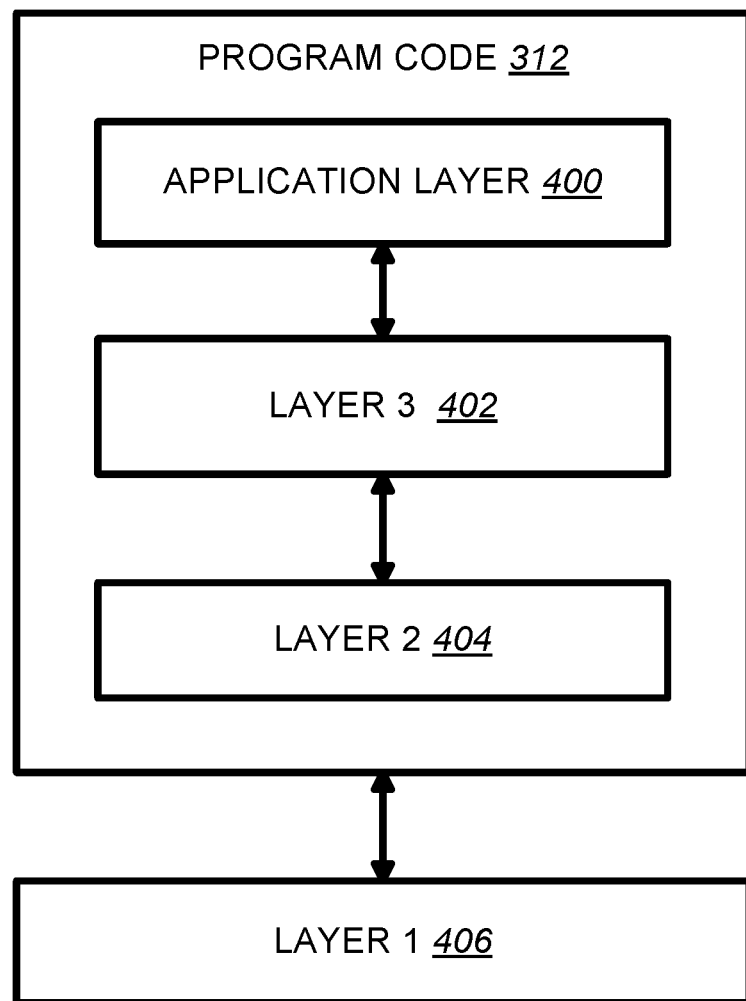
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. The next generation access technology arms to support the following three families of usage scenarios for satisfying both the urgent market needs and the more long-term requirements set forth by the ITU-R IMT-2020:
eMBB (enhanced Mobile Broadband)
mMTC (massive Machine Type Communications)
URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

In LTE, random access, SR (Scheduling Request), and BSR (Buffer Status Report) procedure is defined in 3GPP TS 36.321. The random access procedure and SR procedure and the BSR procedure are design for UE to autonomously request uplink resource for data available for transmission in the buffer. 3GPP TS 36.321 provides the following details for UE to perform SR, BSR, and RA:

5.1 Random Access Procedure
5.1.1 Random Access Procedure Initialization

The Random Access procedure described in this subclause is initiated by a PDCCH order, by the MAC sublayer itself or by the RRC sublayer. Random Access procedure on an SCell shall only be initiated by a PDCCH order. If a MAC entity receives a PDCCH transmission consistent with a PDCCH order [5] masked with its C-RNTI, and for a specific Serving Cell, the MAC entity shall initiate a Random Access procedure on this Serving Cell. For Random Access on the SpCell a PDCCH order or RRC optionally indicate the ra-Preambleindex and the ra-PRACH-MaskIndex, except for NB-IoT where the subcarrier index is indicated; and for Random Access on an SCell, the PDCCH order indicates the ra-Preambleindex with a value different from 000000 and the ra-PRACH-MaskIndex. For the pTAG preamble transmission on PRACH and reception of a PDCCH order are only supported for SpCell. If the UE is an NB-IoT UE, the Random Access procedure is performed on the anchor carrier or one of the non-anchor carriers for which PRACH resource has been configured in system information.

Before the procedure can be initiated, the following information for related Serving Cell is assumed to be available for UEs other than NB-IoT UEs, BL UEs or UEs in enhanced coverage [8], unless explicitly stated otherwise:
the available set of PRACH resources for the transmission of the Random Access Preamble, prach-Configindex.
the groups of Random Access Preambles and the set of available Random Access Preambles in each group (SpCell only):
The preambles that are contained in Random Access Preambles group A and Random Access Preambles group B are calculated from the parameters numberOfRA-Preambles and sizeOfRA-PreamblesGroupA:
If sizeOfRA-PreamblesGroupA is equal to numberOfRA-Preambles then there is no Random Access Preambles group B. The preambles in Random Access Preamble group A are the preambles 0 to sizeOfRA-PreamblesGroupA−1 and, if it exists, the preambles in Random Access Preamble group B are the preambles sizeOfRA-PreamblesGroupA to numberOfRA-Preambles−1 from the set of 64 preambles as defined in [7].
if Random Access Preambles group B exists, the thresholds, messagePowerOffsetGroupB and messageSizeGroupA, the configured UE transmitted power of the Serving Cell performing the Random Access Procedure, $P_{CMAX, c}$ [10], and the offset between the preamble and Msg3, deltaPreambleMsg3, that are required for selecting one of the two groups of Random Access Preambles (SpCell only).
the RA response window size ra-ResponseWindowSize.
the power-ramping factor powerRampingStep.
the maximum number of preamble transmission preambleTransMax.
the initial preamble power preambleInitialReceivedTargetPower.
the preamble format based offset DELTA_PREAMBLE (see subclause 7.6).
the maximum number of Msg3 HARQ transmissions maxHARQ-Msg3Tx (SpCell only).
the Contention Resolution Timer mac-ContentionResolutionTimer (SpCell only).
NOTE: The above parameters may be updated from upper layers before each Random Access procedure is initiated.

The following information for related Serving Cell is assumed to be available before the procedure can be initiated for NB-IoT UEs, BL UEs or UEs in enhanced coverage [8]:
if the UE is a BL UE or a UE in enhanced coverage:
the available set of PRACH resources associated with each enhanced coverage level supported in the Serving Cell for the transmission of the Random Access Preamble, prach-Configindex.
the groups of Random Access Preambles and the set of available Random Access Preambles in each group (SpCell only):
If sizeOfRA-PreamblesGroupA is not equal to numberOfRA-Preambles:
Random Access Preambles group A and B exist and are calculated as above;
else:
the preambles that are contained in Random Access Preamble groups for each enhanced coverage level, if it exists, are the preambles firstPreamble to lastPreamble.
NOTE: When a PRACH resource is shared for multiple CE-levels, and CE-level are differentiated by different preamble indices, Group A and Group B is not used for this PRACH resource.
if the UE is an NB-IoT UE:
the available set of PRACH resources supported in the Serving Cell on the anchor carrier, nprach-ParametersList, and on the non-anchor carriers, in ul-ConfigList.
for random access resource selection and preamble transmission:
a PRACH resource is mapped into an enhanced coverage level.
each PRACH resource contains a set of nprach-NumSubcarriers subcarriers which can be partitioned into one or two groups for single/multi-tone Msg3 transmission by nprach-SubcarrierMSG3-RangeStart and nproch-NumCBRA-StartSubcarriers as specified in TS 36.211 [7, 10.1.6.1]. Each group is referred to as a Random Access Preamble group below in the procedure text.

a subcarrier is identified by the subcarrier index in the range: [nprach-SubcarrierOffset, nprach-SubcarrierOffset+nprach-NumSubcarriers−1]

each subcarrier of a Random Access Preamble group corresponds to a Random Access Preamble.

when the subcarrier index is explicitly sent from the eNB as part of a PDCCH order ra-Preambleindex shall be set to the signalled subcarrier index.

the mapping of the PRACH resources into enhanced coverage levels is determined according to the following:

the number of enhanced coverage levels is equal to one plus the number of RSRP thresholds present in rsrp-ThresholdsPrachInfoList.

each enhanced coverage level has one anchor carrier PRACH resource present in nprach-ParametersList and zero or one PRACH resource for each non-anchor carrier signalled in ul-ConfigList.

enhanced coverage levels are numbered from 0 and the mapping of PRACH resources to enhanced coverage levels are done in increasing numRepetitionsPerPreambleAttempt order.

when multiple carriers provide PRACH resources for the same enhanced coverage level, the UE will randomly select one of them using the following selection probabilities:

the selection probability of the anchor carrier PRACH resource for the given enhanced coverage level, nprach-ProbabilityAnchor, is given by the corresponding entry in nprach-ProbabilityAnchorList the selection probability is equal for all non-anchor carrier PRACH resources and the probability of selecting one PRACH resource on a given non-anchor carrier is (1−nprach-ProbabilityAnchor)/(number of non-anchor NPRACH resources)

the criteria to select PRACH resources based on RSRP measurement per enhanced coverage level supported in the Serving Cell rsrp-ThresholdsPrachInfoList.

the maximum number of preamble transmission attempts per enhanced coverage level supported in the Serving Cell maxNumPreambleAttemptCE.

the number of repetitions required for preamble transmission per attempt for each enhanced coverage level supported in the Serving Cell numRepetitionPerPreambleAttempt.

the configured UE transmitted power of the Serving Cell performing the Random Access Procedure, $P_{CMAX, c}$ [10].

the RA response window size ra-ResponseWindowSize and the Contention Resolution Timer mac-ContentionResolutionTimer (SpCell only) per enhanced coverage level supported in the Serving Cell.

the power-ramping factor powerRampingStep.

the maximum number of preamble transmission preambleTransMax-CE.

the initial preamble power preambleInitialReceivedTargetPower.

the preamble format based offset DELTA_PREAMBLE (see subclause 7.6). For NB-IoT the DELTA_PREAMBLE is set to 0.

The Random Access procedure shall be performed as follows:

Flush the Msg3 buffer;

set the PREAMBLE_TRANSMISSION_COUNTER to 1;

if the UE is an NB-IoT UE, a BL UE or a UE in enhanced coverage:

set the PREAMBLE_TRANSMISSION_COUNTER_CE to 1;

if the starting enhanced coverage level, or for NB-IoT the starting number of NPRACH repetitions, has been indicated in the PDCCH order which initiated the Random Access procedure, or if the starting enhanced coverage level has been provided by upper layers:

the MAC entity considers itself to be in that enhanced coverage level regardless of the measured RSRP;

else:

if the RSRP threshold of enhanced coverage level 3 is configured by upper layers in rsrp-ThresholdsPrachInfoList and the measured RSRP is less than the RSRP threshold of enhanced coverage level 3 and the UE is capable of enhanced coverage level 3 then:

the MAC entity considers to be in enhanced coverage level 3;

else if the RSRP threshold of enhanced coverage level 2 configured by upper layers in rsrp-ThresholdsPrachInfoList and the measured RSRP is less than the RSRP threshold of enhanced coverage level 2 and the UE is capable of enhanced coverage level 2 then:

the MAC entity considers to be in enhanced coverage level 2;

else if the measured RSRP is less than the RSRP threshold of enhanced coverage level 1 as configured by upper layers in rsrp-ThresholdsPrachInfoList then:

the MAC entity considers to be in enhanced coverage level 1;

else:

the MAC entity considers to be in enhanced coverage level 0;

set the backoff parameter value to 0 ms;

for the RN, suspend any RN subframe configuration;

proceed to the selection of the Random Access Resource (see subclause 5.1.2).

NOTE: There is only one Random Access procedure ongoing at any point in time in a MAC entity. If the MAC entity receives a request for a new Random Access procedure while another is already ongoing in the MAC entity, it is up to UE implementation whether to continue with the ongoing procedure or start with the new procedure.

NOTE: An NB-IoT UE measures RSRP on the anchor carrier.

5.1.2 Random Access Resource Selection

The Random Access Resource selection procedure shall be performed as follows:

For BL UEs or UEs in enhanced coverage, select the PRACH resource set corresponding to the selected enhanced coverage level.

If, except for NB-IoT, ra-Preambleindex (Random Access Preamble) and ra-PRACH-MaskIndex (PRACH Mask Index) have been explicitly signalled and ra-Preambleindex is not 000000:

the Random Access Preamble and the PRACH Mask Index are those explicitly signalled;

else, for NB-IoT, if ra-Preambleindex (Random Access Preamble) and PRACH resource have been explicitly signalled:
  the PRACH resource is that explicitly signalled;
  if the ra-Preambleindex signalled is not 000000:
    the Random Access Preamble is set to nprach-SubcarrierOffset+nprach-NumCBRA-StartSubcarriers+(ra-Preambleindex modulo (nprach-NumSubcarriers−nprach-NumCBRA-StartSubcarriers)), where nprach-SubcarrierOffset, nprach-NumCBRA-StartSubcarriers and nprach-NumSubcarriers are parameters in the currently used PRACH resource.
  else:
    select the Random Access Preamble group according to the PRACH resource and the support for multi-tone Msg3 transmission. A UE supporting multi-tone Msg3 shall only select the single-tone Msg3 Random Access Preambles group if there is no multi-tone Msg3 Random Access Preambles group.
    randomly select a Random Access Preamble within the selected group.
else the Random Access Preamble shall be selected by the MAC entity as follows:
  For BL UEs or UEs in enhanced coverage, if Random Access Preamble group B does not exist, select the Random Access Preambles group corresponding to the selected enhanced coverage level.
  For NB-IoT, randomly select one of the PRACH resources corresponding to the selected enhanced coverage level according to the configured probability distribution, and select the Random Access Preambles group corresponding to the PRACH resource and the support for multi-tone Msg3 transmission. A UE supporting multi-tone Msg3 shall only select the single-tone Msg3 Random Access Preambles group if there is no multi-tone Msg3 Random Access Preambles group.
  Except for BL UEs or UEs in enhanced coverage in case preamble group B does not exist, or except for NB-IoT UEs, if Msg3 has not yet been transmitted, the MAC entity shall:
    if Random Access Preambles group B exists and any of the following events occur:
      the potential message size (UL data available for transmission plus MAC header and, where required, MAC control elements) is greater than messageSizeGroupA and the pathloss is less than $P_{CMAX,c}$ (of the Serving Cell performing the Random Access Procedure)−preambleInitialReceivedTargetPower−deltaPreambleMsg3−messagePowerOffsetGroupB;
      the Random Access procedure was initiated for the CCCH logical channel and the CCCH SDU size plus MAC header is greater than messageSizeGroupA;
      select the Random Access Preambles group B;
    else:
      select the Random Access Preambles group A.
  else, if Msg3 is being retransmitted, the MAC entity shall:
    select the same group of Random Access Preambles as was used for the preamble transmission attempt corresponding to the first transmission of Msg3.
  randomly select a Random Access Preamble within the selected group. The random function shall be such that each of the allowed selections can be chosen with equal probability;
  except for NB-IoT, set PRACH Mask Index to 0.
determine the next available subframe containing PRACH permitted by the restrictions given by the prach-Configindex (except for NB-IoT), the PRACH Mask Index (except for NB-IoT, see subclause 7.3), physical layer timing requirements [2] and in case of NB-IoT, the subframes occupied by PRACH resources related to a higher enhanced coverage level (a MAC entity may take into account the possible occurrence of measurement gaps when determining the next available PRACH subframe);
if the transmission mode is TDD and the PRACH Mask Index is equal to zero:
  if ra-Preambleindex was explicitly signalled and it was not 000000 (i.e., not selected by MAC):
    randomly select, with equal probability, one PRACH from the PRACHs available in the determined subframe.
  else:
    randomly select, with equal probability, one PRACH from the PRACHs available in the determined subframe and the next two consecutive subframes.
else:
  determine a PRACH within the determined subframe in accordance with the requirements of the PRACH Mask Index, if any.
for NB-IoT UEs, BL UEs or UEs in enhanced coverage, select the ra-ResponseWindowSize and mac-ContentionResolutionTimer corresponding to the selected enhanced coverage level and PRACH.
proceed to the transmission of the Random Access Preamble (see subclause 5.1.3).

5.1.3 Random Access Preamble Transmission

The random-access procedure shall be performed as follows:
  set PREAMBLE_RECEIVED_TARGET_POWER to preambleInitialReceivedTargetPower+DELTA_PREAMBLE+(PREAMBLE_TRANSMISSION_ COUNTER−1)*powerRampingStep;
  if the UE is a BL UE or a UE in enhanced coverage:
    the PREAMBLE_RECEIVED_TARGET_POWER is set to: PREAMBLE_RECEIVED_TARGET_POWER−10*log 10(numRepetitionPerPreambleAttempt);
  if NB-1° T:
    for enhanced coverage level 0, the PREAMBLE_RECEIVED_TARGET_POWER is set to: PREAMBLE_RECEIVED_TARGET_POWER−10*log 10(numRepetitionPerPreambleAttempt)
    for other enhanced coverage levels, the PREAMBLE_RECEIVED_TARGET_POWER is set corresponding to the max UE output power;
  if the UE is an NB-IoT UE, a BL UE or a UE in enhanced coverage:
    instruct the physical layer to transmit a preamble with the number of repetitions required for preamble transmission corresponding to the selected preamble group (i.e., numRepetitionPerPreambleAttempt) using the selected PRACH corresponding to the selected enhanced coverage level, corresponding RA-RNTI, preamble index or for NB-IoT subcarrier index, and PREAMBLE_RECEIVED_TARGET_POWER.

else:
 instruct the physical layer to transmit a preamble using the selected PRACH, corresponding RA-RNTI, preamble index and PREAMBLE_RECEIVED_TARGET_POWER.

5.1.4 Random Access Response Reception

Once the Random Access Preamble is transmitted and regardless of the possible occurrence of a measurement gap or a Sidelink Discovery Gap for Transmission or a Sidelink Discovery Gap for Reception, the MAC entity shall monitor the PDCCH of the SpCell for Random Access Response(s) identified by the RA-RNTI defined below, in the RA Response window which starts at the subframe that contains the end of the preamble transmission [7] plus three subframes and has length ra-ResponseWindowSize. If the UE is a BL UE or a UE in enhanced coverage, RA Response window starts at the subframe that contains the end of the last preamble repetition plus three subframes and has length ra-ResponseWindowSize for the corresponding coverage level. If the UE is an NB-IoT UE, in case the number of NPRACH repetitions is greater than or equal to 64, RA Response window starts at the subframe that contains the end of the last preamble repetition plus 41 subframes and has length ra-ResponseWindowSize for the corresponding coverage level, and in case the number of NPRACH repetitions is less than 64, RA Response window starts at the subframe that contains the end of the last preamble repetition plus 4 subframes and has length ra-ResponseWindowSize for the corresponding coverage level. The RA-RNTI associated with the PRACH in which the Random Access Preamble is transmitted, is computed as:

$$RA\text{-}RNTI=1+t\_id+10*f\_id$$

where t_id is the index of the first subframe of the specified PRACH ($0 \leq t\_id < 10$), and f_id is the index of the specified PRACH within that subframe, in ascending order of frequency domain ($0 \leq f\_id < 6$) except for NB-IoT UEs, BL UEs or UEs in enhanced coverage. If the PRACH resource is on a TDD carrier, the f_id is set to $f_{RA}$, where $f_{RA}$, s defined in Section 5.7.1 of [7].

For BL UEs and UEs in enhanced coverage, RA-RNTI associated with the PRACH in which the Random Access Preamble is transmitted, is computed as:

$$RA\text{-}RNTI=1+t\_id+10*f\_id+60*(SFN\_id \bmod(W \max/10))$$

where t_id is the index of the first subframe of the specified PRACH ($0 \leq t\_id < 10$), f_id is the index of the specified PRACH within that subframe, in ascending order of frequency domain ($0 \leq f\_id < 6$), SFN_id is the index of the first radio frame of the specified PRACH, and Wmax is 400, maximum possible RAR window size in subframes for BL UEs or UEs in enhanced coverage. If the PRACH resource is on a TDD carrier, the f_id is set to $f_{RA}$, where $f_{RA}$ is defined in Section 5.7.1 of [7].

For NB-IoT UEs, the RA-RNTI associated with the PRACH in which the Random Access Preamble is transmitted, is computed as:

$$RA\text{-}RNTI=1+\operatorname{floor}(SFN\_id/4)+256*carrier\_id$$

where SFN_id is the index of the first radio frame of the specified PRACH and carrier_id is the index of the UL carrier associated with the specified PRACH. The carrier_id of the anchor carrier is 0.

The MAC entity may stop monitoring for Random Access Response(s) after successful reception of a Random Access Response containing Random Access Preamble identifiers that matches the transmitted Random Access Preamble.

If a downlink assignment for this TTI has been received on the PDCCH for the RA-RNTI and the received TB is successfully decoded, the MAC entity shall regardless of the possible occurrence of a measurement gap or a Sidelink Discovery Gap for Transmission or a Sidelink Discovery Gap for Reception:
 if the Random Access Response contains a Backoff Indicator subheader:
  set the backoff parameter value as indicated by the BI field of the Backoff Indicator subheader and Table 7.2-1, except for NB-IoT where the value from Table 7.2-2 is used.
 else, set the backoff parameter value to 0 ms.
 if the Random Access Response contains a Random Access Preamble identifier corresponding to the transmitted Random Access Preamble (see subclause 5.1.3), the MAC entity shall:
  consider this Random Access Response reception successful and apply the following actions for the serving cell where the Random Access Preamble was transmitted:
  process the received Timing Advance Command (see subclause 5.2);
  indicate the preambleInitialReceivedTargetPower and the amount of power ramping applied to the latest preamble transmission to lower layers (i.e., (PREAMBLE_TRANSMISSION_COUNTER–1)*powerRampingStep);
  if the SCell is configured with ul-Configuration-r14, ignore the received UL grant otherwise process the received UL grant value and indicate it to the lower layers;
  if ra-Preambleindex was explicitly signalled and it was not 000000 (i.e., not selected by MAC):
  consider the Random Access procedure successfully completed.
  if the UE is an NB-IoT UE:
   the UL grant contained in the PDCCH transmission is valid only for the configured carrier.
  else, if the Random Access Preamble was selected by the MAC entity:
  set the Temporary C-RNTI to the value received in the Random Access Response message no later than at the time of the first transmission corresponding to the UL grant provided in the Random Access Response message;
  if this is the first successfully received Random Access Response within this Random Access procedure:
   if the transmission is not being made for the CCCH logical channel, indicate to the Multiplexing and assembly entity to include a C-RNTI MAC control element in the subsequent uplink transmission;
   obtain the MAC PDU to transmit from the "Multiplexing and assembly" entity and store it in the Msg3 buffer.
 NOTE: When an uplink transmission is required, e.g., for contention resolution, the eNB should not provide a grant smaller than 56 bits (or 88 bits for NB-1° T) in the Random Access Response.
 NOTE: If within a Random Access procedure, an uplink grant provided in the Random Access Response for the same group of Random Access Preambles has a different size than the first uplink grant allocated during that Random Access procedure, the UE behavior is not defined.

If no Random Access Response or, for BL UEs or UEs in enhanced coverage for mode B operation, no PDCCH scheduling Random Access Response is received within the RA Response window, or if none of all received Random Access Responses contains a Random Access Preamble identifier corresponding to the transmitted Random Access Preamble, the Random Access Response reception is considered not successful and the MAC entity shall:
  if the notification of power ramping suspension has not been received from lower layers:
    increment PREAMBLE_TRANSMISSION_ COUNTER by 1;
    if the UE is an NB-IoT UE, a BL UE or a UE in enhanced coverage:
      if PREAMBLE_TRANSMISSION_COUNTER= preambleTransMax-CE+1:
        if the Random Access Preamble is transmitted on the SpCell:
          indicate a Random Access problem to upper layers;
        if NB-1° T:
          consider the Random Access procedure unsuccessfully completed;
    else:
      if PREAMBLE_TRANSMISSION_COUNTER= preambleTransMax+1:
        if the Random Access Preamble is transmitted on the SpCell:
          indicate a Random Access problem to upper layers;
        if the Random Access Preamble is transmitted on an SCell:
          consider the Random Access procedure unsuccessfully completed.
  if in this Random Access procedure, the Random Access Preamble was selected by MAC:
    based on the backoff parameter, select a random backoff time according to a uniform distribution between 0 and the Backoff Parameter Value;
    delay the subsequent Random Access transmission by the backoff time;
  else if the SCell where the Random Access Preamble was transmitted is configured with ul-Configuration-r14:
  delay the subsequent Random Access transmission until the Random Access Procedure
    is initiated by a PDCCH order with the same ra-PreambleIndex and ra-PRACH-MaskIndex;
  if the UE is an NB-IoT UE, a BL UE or a UE in enhanced coverage:
    increment PREAMBLE_TRANSMISSION_COUNTER_CE by 1;
    if PREAMBLE_TRANSMISSION_COUNTER_ CE=maxNumPreambleAttemptCE for the corresponding enhanced coverage level+1:
      reset PREAMBLE_TRANSMISSION_COUNTER_CE;
      consider to be in the next enhanced coverage level, if it is supported by the Serving Cell and the UE, otherwise stay in the current enhanced coverage level;
    if the UE is an NB-IoT UE:
      if the Random Access Procedure was initiated by a PDCCH order:
        select the PRACH resource in the list of UL carriers providing a PRACH resource for the selected enhanced coverage level for which the carrier index is equal to ((Carrier Index from the PDCCH order) modulo (Number of PRACH resources in the selected enhanced coverage));
        consider the selected PRACH resource as explicitly signalled;
    proceed to the selection of a Random Access Resource (see subclause 5.1.2).

5.1.5 Contention Resolution

Contention Resolution is based on either C-RNTI on PDCCH of the SpCell or UE Contention Resolution Identity on DL-SCH.

Once Msg3 is transmitted, the MAC entity shall:
  except for a BL UE or a UE in enhanced coverage, or an NB-IoT UE, start mac-ContentionResolutionTimer and restart mac-ContentionResolutionTimer at each HARQ retransmission;
  for a BL UE or a UE in enhanced coverage, or an NB-IoT UE, start mac-ContentionResolutionTimer and restart mac-ContentionResolutionTimer at each HARQ retransmission of the bundle in the subframe containing the last repetition of the corresponding PUSCH transmission;
  regardless of the possible occurrence of a measurement gap or Sidelink Discovery Gap for Reception, monitor the PDCCH until mac-ContentionResolutionTimer expires or is stopped;
  if notification of a reception of a PDCCH transmission is received from lower layers, the MAC entity shall:
    if the C-RNTI MAC control element was included in Msg3:
      if the Random Access procedure was initiated by the MAC sublayer itself or by the RRC sublayer and the PDCCH transmission is addressed to the C-RNTI and contains an UL grant for a new transmission; or
      if the Random Access procedure was initiated by a PDCCH order and the PDCCH transmission is addressed to the C-RNTI:
        consider this Contention Resolution successful;
        stop mac-ContentionResolutionTimer;
        discard the Temporary C-RNTI;
        if the UE is an NB-IoT UE:
          the UL grant or DL assignment contained in the PDCCH transmission is valid only for the configured carrier.
        consider this Random Access procedure successfully completed.
    else if the CCCH SDU was included in Msg3 and the PDCCH transmission is addressed to its Temporary C-RNTI:
      if the MAC PDU is successfully decoded:
        stop mac-ContentionResolutionTimer;
        if the MAC PDU contains a UE Contention Resolution Identity MAC control element; and
        if the UE Contention Resolution Identity included in the MAC control element matches the 48 first bits of the CCCH SDU transmitted in Msg3:
          consider this Contention Resolution successful and finish the disassembly and demultiplexing of the MAC PDU;
          set the C-RNTI to the value of the Temporary C-RNTI;
          discard the Temporary C-RNTI;
          consider this Random Access procedure successfully completed.

else
    discard the Temporary C-RNTI;
        consider this Contention Resolution not successful and discard the successfully decoded MAC PDU.
if mac-ContentionResolutionTimer expires:
    discard the Temporary C-RNTI;
    consider the Contention Resolution not successful.
if the Contention Resolution is considered not successful the MAC entity shall:
    flush the HARQ buffer used for transmission of the MAC PDU in the Msg3 buffer;
    if the notification of power ramping suspension has not been received from lower layers:
        increment PREAMBLE_TRANSMISSION_COUNTER by 1;
    if the UE is an NB-IoT UE, a BL UE or a UE in enhanced coverage:
        if PREAMBLE_TRANSMISSION_COUNTER= preambleTransMax-CE+1:
        indicate a Random Access problem to upper layers.
        if NB-IoT:
            consider the Random Access procedure unsuccessfully completed;
    else:
        if PREAMBLE_TRANSMISSION_COUNTER= preambleTransMax+1:
        indicate a Random Access problem to upper layers.
    based on the backoff parameter, select a random backoff time according to a uniform distribution between 0 and the Backoff Parameter Value;
    delay the subsequent Random Access transmission by the backoff time;
    proceed to the selection of a Random Access Resource (see subclause 5.1.2).

5.1.6 Completion of the Random Access Procedure

At completion of the Random Access procedure, the MAC entity shall:
    discard explicitly signalled ra-PreambleIndex and ra-PRACH-MaskIndex, if any;
    flush the HARQ buffer used for transmission of the MAC PDU in the Msg3 buffer.
In addition, the RN shall resume the suspended RN subframe configuration, if any. [ . . . ]

5.4.4 Scheduling Request

The Scheduling Request (SR) is used for requesting UL-SCH resources for new transmission. When an SR is triggered, it shall be considered as pending until it is cancelled. All pending SR(s) shall be cancelled and sr-ProhibitTimer shall be stopped when a MAC PDU is assembled and this PDU includes a BSR which contains buffer status up to (and including) the last event that triggered a BSR (see subclause 5.4.5), or, if all pending SR(s) are triggered by Sidelink BSR, when a MAC PDU is assembled and this PDU includes a Sidelink BSR which contains buffer status up to (and including) the last event that triggered a Sidelink BSR (see subclause 5.14.1.4), or, if all pending SR(s) are triggered by Sidelink BSR, when upper layers configure autonomous resource selection, or when the UL grant(s) can accommodate all pending data available for transmission.

If an SR is triggered and there is no other SR pending, the MAC entity shall set the SR_COUNTER to 0.

As long as one SR is pending, the MAC entity shall for each TTI:
    if no UL-SCH resources are available for a transmission in this TTI:
        if the MAC entity has no valid PUCCH resource for SR configured in any TTI and if rach-Skip for the MCG MAC entity or rach-SkipSCG for the SCG MAC entity is not configured: initiate a Random Access procedure (see subclause 5.1) on the SpCell and cancel all pending SRs;
        else if the MAC entity has at least one valid PUCCH resource for SR configured for this TTI and if this TTI is not part of a measurement gap or Sidelink Discovery Gap for Transmission and if sr-ProhibitTimer is not running:
            if SR_COUNTER<dsr-TransMax:
            increment SR_COUNTER by 1;
            instruct the physical layer to signal the SR on one valid PUCCH resource for SR;
            start the sr-ProhibitTimer.
        else:
            notify RRC to release PUCCH for all serving cells;
            notify RRC to release SRS for all serving cells;
            clear any configured downlink assignments and uplink grants;
            initiate a Random Access procedure (see subclause 5.1) on the SpCell and cancel all pending SRs.
        NOTE: The selection of which valid PUCCH resource for SR to signal SR on when the MAC entity has more than one valid PUCCH resource for SR in one TTI is left to UE implementation.
        NOTE: SR_COUNTER is incremented for each SR bundle. sr-ProhibitTimer is started in the first TTI of an SR bundle.

3GPP TR 38.802 provides the following descriptions related to beam failure and beam management:

6.1.6.1 Beam Management

In NR, beam management is defined as follows:
    Beam management: a set of L1/L2 procedures to acquire and maintain a set of TRP(s) and/or UE beams that can be used for DL and UL transmission/reception, which include at least following aspects:
    Beam determination: for TRP(s) or UE to select of its own Tx/Rx beam(s).
    Beam measurement: for TRP(s) or UE to measure characteristics of received beamformed signals
    Beam reporting: for UE to report information of beamformed signal(s) based on beam measurement
    Beam sweeping: operation of covering a spatial area, with beams transmitted and/or received during a time interval in a predetermined way.

[ . . . ]

NR supports that UE can trigger mechanism to recover from beam failure. Beam failure event occurs when the quality of beam pair link(s) of an associated control channel falls low enough (e.g. comparison with a threshold, time-out of an associated timer). Mechanism to recover from beam failure is triggered when beam failure occurs. Note that here the beam pair link is used for convenience, and may or may not be used in specification. Network explicitly configures to UE with resources for UL transmission of signals for recovery purpose. Configurations of resources are supported where the base station is listening from all or partial directions, e.g., random access region. The UL transmission/resources to report beam failure can be located in the same time instance as PRACH (resources orthogonal to PRACH resources) or at a time instance (configurable for a UE) different from PRACH. Transmission of DL signal is supported for allowing the UE to monitor the beams for identifying new potential beams.

In RAN2, discussions related to beam recovery are contributed in RAN2#NR adhoc 2 meeting, as captured in 3GPP R2-1707198 as follows:

Beam Recovery

In UE event triggered beam recovery, UE is configured with certain conditions when it determines the need for beam recovery. One potential way to detect need for recovery is to use the beam measurements (provided by L1). L2 may be configured to monitor specific beams that are allocated for PDCCH reception. Detecting signal degradation on those beams should trigger recovery actions. For the recovery actions, UE should indicate to the network new potential beams (if available) via L1/L2 beam reporting or it should request network to switch to alternative beam (for PDCCH monitoring) if such beam exists.

For beam recovery following signals/channels could be used:
  Contention free signals/Scheduling Request on PUCCH/ PRACH:
    RAN1 has not yet explicitly agreed to have the scheduling request signals configured to PRACH period but has agreed that SR can be conveyed at least on PUCCH.
    Scheduling request, SR, is conventionally used by UE to request UL-SCH resources for new data transmission. From beam management perspective, SR can be used to request resources for transmitting beam report to indicate candidate beams (CSI-RS) for PDCCH reception. Specific triggering conditions can be specified and configured by the network when the UE can trigger SR transmission for beam recovery. SR may also be used for other beam management events.
    RAN1 has agreed that beam recovery signal may be additionally used for SR. In our view the SR and beam recovery signal should have joint design and configuration: SR signal can indicate both recovery request and scheduling request.
    SR signal should be able to be configured to indicate at least specific SS block: If UE detects alternative beams (based on CSI-RS measurements) when current link has failed the SR can be triggered to a corresponding SS block.
  RACH:
    Use of Random access procedure may be used as fall back mechanism when the link cannot be recovered by other means (i.e. UE has not been configured with dedicated recovery signal such as SS block specific SR) but UE has detected potential beams in a current serving cell. In RA-procedure UE could indicate recovery by indicating new preferred beam by sending msg1 on RACH resource corresponding to a specific (SS block). Network is able to detect the link recovery e.g. based on the UE identity in msg3. Additionally, UE may send beam report e.g. in msg3.
    Observation 1: SR signal (if configured) can be used for beam recovery. SR signal indicates a specific SS block.
    Observation 2: Contention based RACH procedure can be used for beam recovery as a fall back option.
    SR triggers are defined in MAC spec in LTE, both for dedicated SR resources and random access. The same is assumed to apply in NR. It is beneficial to have all SR triggers in one place and therefore, the beam recovery triggers should be defined in MAC spec. Similarly, also the triggers to fallback to random access should be defined in the same place.

Proposal 1: If beam recovery procedure is configured to use contention free (dedicated) signaling resources such as SR, the trigger should be defined in MAC spec together with other triggers for SR.

Proposal 2: If beam recovery uses PRACH resources, the trigger should be defined in MAC (together with SR triggers).

Beam management for NR is discussed as mobility without RRC involvement. Beam recovery is part of the beam management. Therefore, it should be a L1/L2 procedure without RRC involvement i.e. beam recovery procedure tries to obtain new PDCCH beam when current PDCCH beam fails. Taking into account the proposals 3 and 4 we propose in general:

Proposal 3: Determining when to use contention free and when to use contention based recovery is a MAC layer function.

Proposal 4: Beam recovery is L1/L2 procedure without RRC involvement.

Proposal 5: Triggering Beam Recovery should be based on events that are network configurable.

In NR, beam recovery request is discussed in RAN1. Related agreements are described in Final Report of 3GPP TSG RAN WG1 #86bis, Final Report of 3GPP TSG RAN WG1 #87, Final Report of 3GPP TSG RAN WG1 #AH1_NR, Final Report of 3GPP TSG RAN WG1 #88, Final Report of 3GPP TSG RAN WG1 #88bis, Final Report of 3GPP TSG RAN WG1 #89, Final Report of 3GPP TSG RAN WG1 #AH_NR2, Final Chairman's Note of 3GPP TSG RAN WG1 Meeting #90, Final Chairman's Note of 3GPP TSG RAN WG1 Meeting #AH_NR3, and Final Chairman's Note of 3GPP TSG RAN WG1 Meeting #90bis as follows:

Agreements:
  NR supports mechanism(s) in the case of link failure and/or blockage for NR
    Whether to use new procedure is FFS
    Study at least the following aspects:
      Whether or not an DL or UL signal transmission for this mechanism is needed
        E.g., RACH preamble sequence, DL/UL reference signal, control channel, etc.
      If needed, resource allocation for this mechanisms
        E.g., RACH resource corresponding mechanism, etc.
Agreements:
  NR supports that UE can trigger mechanism to recover from beam failure
  Network explicitly configures to UE with resources for UL transmission of signals for recovery purpose
    Support configurations of resources where the base station is listening from all or partial directions, e.g., random access region
  FFS: Triggering condition of recovery signal (FFS new or existing signals) associated UE behavior of monitoring RS/control channel/data channel
  Support transmission of DL signal for allowing the UE to monitor the beams for identifying new potential beams
    FFS: Transmission of a beam swept control channel is not precluded
  This mechanism(s) should consider tradeoff between performance and DL signaling overhead
Agreements:
  Beam failure event occurs when the quality of beam pair link(s) of an associated control channel falls low enough (e.g. comparison with a threshold, time-out of an associated timer). Mechanism to recover from beam failure is triggered when beam failure occurs Note: here the beam pair link is used for convenience, and may or may not be used in specification
FFS: whether quality can additionally include quality of beam pair link(s) associated with NR-PDSCH
FFS: when multiple Y beam pair links are configured, X (<=Y) out of Y beam pair links falls below certain threshold fulfilling beam failure condition may declare beam failure
FFS: search space (UE-specific vs. common) of the associated NR-PDCCH
FFS: signaling mechanisms for NR-PDCCH in the case of UE is configured to monitor multiple beam pair links for NR-PDCCH
Exact definition of such threshold is FFS and other conditions for triggering such mechanism are not precluded
The following signals can be configured for detecting beam failure by UE and for identifying new potential beams by UE
FFS the signals, e.g., RS for beam management, RS for fine timing/frequency tracking, SS blocks, DM-RS of PDCCH (including group common PDCCH and/or UE specific PDCCH), DMRS for PDSCH
If beam failure event occurs and there are no new potential beams to the serving cell, FFS whether or not the UE provides an indication to L3.
Note: the criterion for declaring radio link failure is for RAN2 to decide.
FFS: The necessity of such indication
NR supports configuring resources for sending request for recovery purposes in symbols containing RACH and/or
FFS scheduling request or in other indicated symbols
Agreements:
The following mechanisms should be supported in NR:
The UL transmission to report beam failure can be located in the same time instance as PRACH:
Resources orthogonal to PRACH resources
FFS orthogonal in frequency and/or sequences (not intended to impact PRACH design)
FFS channels/signals
The UL transmission to report beam failure can be located at a time instance (configurable for a UE) different from PRACH
Consider the impact of RACH periodicity in configuring the UL signal to report beam failure located in slots outside PRACH
FFS the signal/channel for the UL transmission
Additional mechanisms using other channels/signals are not precluded (e.g., SR, UL grant free PUSCH, UL control)
Agreements:
UE Beam failure recovery mechanism includes the following aspects
Beam failure detection
New candidate beam identification
Beam failure recovery request transmission
UE monitors gNB response for beam failure recovery request
Beam failure detection
UE monitors beam failure detection RS to assess if a beam failure trigger condition has been met
Beam failure detection RS at least includes periodic CSI-RS for beam management
SS-block within the serving cell can be considered, if SS-block is also used in beam management as well
FFS: Trigger condition for declaring beam failure
New candidate beam identification
UE monitors beam identification RS to find a new candidate beam
Beam identification RS includes
Periodic CSI-RS for beam management, if it is configured by NW
Periodic CSI-RS and SS-blocks within the serving cell, if SS-block is also used in beam management as well
Beam failure recovery request transmission
Information carried by beam failure recovery request includes at least one followings
Explicit/implicit information about identifying UE and new gNB TX beam information
Explicit/implicit information about identifying UE and whether or not new candidate beam exists
FFS:
Information indicating UE beam failure
Additional information, e.g., new beam quality
Down-selection between the following options for beam failure recovery request transmission
PRACH
PUCCH
PRACH-like (e.g., different parameter for preamble sequence from PRACH)
Beam failure recovery request resource/signal may be additionally used for scheduling request
UE monitors a control channel search space to receive gNB response for beam failure recovery request
FFS: the control channel search space can be same or different from the current control channel search space associated with serving BPLs
FFS: UE further reaction if gNB does not receive beam failure recovery request transmission
Agreements:
Study how to support at least one mechanism when NW receive the beam failure recovery request
E.g., NW assigns UL grant for beam reporting, NW transmits DL RS for beam measurement, NW signal beam indication or confirmation to UE, etc.
E.g., UE assistance on NW decision of which mechanism to apply
Whether or not a specific mechanism has specification impact
Agreement: FFS for the situation of "no new candidate beam", whether or not there are issues, and if so, whether or not RLF procedure can sufficiently handle the issues
Working assumption:
Support at least the following triggering condition(s) for beam failure recovery request transmission:
Condition 1: when beam failure is detected and candidate beam is identified at least for the case when only CSI-RS is used for new candidate beam identification
FFS Condition 2: Beam failure is detected alone at least for the case of no reciprocity
FFS how the recovery request is transmitted without knowledge of candidate beam
Note: if both conditions are supported, which triggering condition to use by UE also depends on both gNB configuration and UE capability Agreements:
Support the following channel(s) for beam failure recovery request transmission:
Non-contention based channel based on PRACH, which uses a resource orthogonal to resources of other PRACH transmissions, at least for the FDM case
FFS other ways of achieving orthogonality, e.g., CDM/TDM with other PRACH resources
FFS whether or not have different sequence and/or format than those of PRACH for other purposes
Note: this does not prevent PRACH design optimization attempt for beam failure recovery request transmission from other agenda item
FFS: Retransmission behavior on this PRACH resource is similar to regular RACH procedure
Support using PUCCH for beam failure recovery request transmission
FFS whether PUCCH is with beam sweeping or not
Note: this may or may not impact PUCCH design
FFS Contention-based PRACH resources as supplement to contention-free beam failure recovery resources
From traditional RACH resource pool
4-step RACH procedure is used
Note: contention-based PRACH resources is used e.g., if a new candidate beam does not have resources for contention-free PRACH-like transmission
FFS whether a UE is semi-statically configured to use one of them or both, if both, whether or not support dynamic selection of one of the channel(s) by a UE if the UE is configured with both
Agreements:
To receive gNB response for beam failure recovery request, a UE monitors NR PDCCH with the assumption that the corresponding PDCCH DM-RS is spatial QCL'ed with RS of the UE-identified candidate beam(s)
FFS whether the candidate beam(s) is identified from a preconfigured set or not
Detection of a gNB's response for beam failure recovery request during a time window is supported
FFS the time window is configured or pre-determined
FFS the number of monitoring occasions within the time window
FFS the size/location of the time window
If there is no response detected within the window, the UE may perform re-tx of the request
FFS details
If not detected after a certain number of transmission(s), UE notifies higher layer entities
FFS the number of transmission(s) or possibly further in combination with or solely determined by a timer
Agreements:
Beam failure is declared only when all serving control channels fail.
When a subset of serving control channels fail, this event should also be handled
Details FFS
Agreements:
In addition to periodic CSI-RS, SS-block within the serving cell can be used for new candidate beam identification The following options can be configured for new candidate beam identification
CSI-RS only
Note: in this case, SSB will not be configured for new candidate beam identification
SS block only
Note: in this case, CSI-RS will not be configured for new candidate beam identification
FFS: CSI-RS+SS block
Working assumption:
For beam failure recovery request transmission on PRACH, support using the resource that is CDM with other PRACH resources.
Note that CDM means the same sequence design with PRACH preambles.
Note that the preambles for PRACH for beam failure recover request transmission are chosen from those for content-free PRACH operation in Rel-15
Note: this feature is not intended to have any impact on design related to other PRACH resources
Further consider whether TDM with other PRACH is needed
Agreement:
WA on trigger condition 1 for beam recovery request transmission is confirmed with following revision
"Support at least the following triggering condition(s) for beam failure recovery request transmission:
Condition 1: when beam failure is detected and candidate beam is identified"
Agreement:
The following working assumption is confirmed
For beam failure recovery request transmission on PRACH, support using the resource that is CDM with other PRACH resources
Note that CDM means the same sequence design with PRACH preambles.
Note that the preambles for PRACH for beam failure recover request transmission are chosen from those for contention-free PRACH operation in Rel-15
Note: this feature is not intended to have any impact on design related to other PRACH resources
Further consider whether TDM with other PRACH is needed
Note: Companies may further study the necessity and feasibility of additional cyclic shifts on the preamble sequences for transmission of beam failure recovery requests
Agreement:
For new candidate beam identification purpose
In CSI-RS only case, a direct association is configured between only CSI-RS resources and dedicated PRACH resources
In SS block only case, a direct association is configured between only SS block resources and dedicated PRACH resources
In CSI-RS+SS block case (if supported), an association is configured between resources of CSI-RS/SSB and dedicated PRACH resources
CSI-RS and SSB can be associated with the same dedicated resource through QCL association
Agreement:
gNB response is transmitted via a PDCCH addressed to C-RNTI
FFS: DCI format for gNB response
Dedicated CORESET(s) is applied for monitoring gNB response for BFRQ. The CORESET is down-selected from the following two alternatives:

Alt 1: the same CORESET (s) as before beam failure
Alt 2: dedicatedly configured CORESET for beam failure recovery.

Agreement:
  Specification supports the CSI-RS+SS block case for the purpose of new candidate beam identification
  The above case is configured by gNB
  Note: a dedicated PRACH resource is configured to either an SSB or a CSI-RS resource
  Following two scenarios are supported when a UE is configured with CSI-RS+SSB
    Scenario 1: PRACHs are associated to SSBs only
      In this scenario, CSI-RS resources for new beam identification can be found from the QCL association to SSB(s).
    Scenario 2: Each of the multiple PRACHs is associated to either an SSB or a CSI-RS resource
  FFS: multiple SSB can be associated with the same uplink resource.
  CATT has concerns on the above agreement that it may not be an essential feature for beam failure recovery Working Assumption:
  Beam failure detection is determined based on the following quality measure:
  Hypothetical PDCCH BLER Proposal:
  A beam recovery request can be transmitted if the number of consecutive detected beam failure instance exceeds a configured maximum number
    (Working assumption) If hypothetical PDCCH BLER is above a threshold, it is counted as beam failure instance
      Note: Beam failure is determined when all serving beams fail
    The candidate beam can be identified when metric X of candidate beam is higher than a threshold
      FFS: metric X
      1 or 2 threshold values are introduced
        If 2 thresholds are introduced, one is for SSB and the other is for CSI-RS
      One of the following alternatives will be down-selected in RAN1#91
        Alt-1: Fixed value
        Alt-2: Configurable value by RRC signaling
      RAN2 should specify the RRC signaling to configuration of the threshold
      Note: for beam failure detection, the UE should aware the transmission power offset between CSI-RS and DMRS of PDCCH
      FFS other details.

Agreement:
  For gNB to uniquely identify UE identity from a beam failure recovery request transmission
  A PRACH sequence is configured to UE Working Assumption:
  At least the following parameters should be configured for dedicated PRACH resources for beam failure recovery
    Per UE parameters
      Preamble sequence related parameters
        E.g., root sequence, cyclic shift, and preamble index
      Maximum number of transmissions
      Maximum number of power rampings
      Target received power
      Retransmission Tx power ramping step size
      Beam failure recovery timer
    Per dedicated PRACH resource parameters
      Frequency location information
      Time location, if it is only a subset of all RACH symbols (e.g., PRACH mask)
      Associated SSB or CSI-RS information
    Note: as a starting point, use initial access preamble transmission mechanism and parameters. If any issue is identified, new mechanism can be introduced.
      No further RRC signalling for above UE parameters is required if reusing the same parameter as initial access
  Email discussion to discuss the remaining beam failure recovery issues in slides 8, 9, 10 of R1-1719174
    Until October 27, Chia-Hao (MediaTek)

Update from Email Approval:
Agreements:
  Support RRC configuration of a time duration for a time window and a dedicated CORESET for a UE to monitor gNB response for beam failure recovery request.
    UE assumes that the dedicated CORESET is spatial QCL'ed with DL RS of the UE-identified candidate beam in the beam failure recovery request.
    FFS: multiple dedicated CORESETs can be configured to a UE, where each CORESET can have different spatial QCL configuration
    Note: the time window is determined by a fixed time offset defined in the spec with respect to beam failure recovery request transmission and the RRC configurable time duration starting from the fixed time offset.
    FFS the value of fixed time offset k (slots).

Agreements:
  Consider following new use cases for RACH design,
    beam recovery requests
    on demand SI requests
  Study the following aspects:
    requirements to satisfy above new use cases
    impact on capacity
    whether additional preamble format(s) is needed
    impact on RACH procedure Agreements:
  IS and OOS indications are based on SINR-like metric (e.g., hypothetical PDCCH BLER) as in LTE
    ✧ SINR-like metric as in LTE represents whether or not UE can receive PDCCH
    ✧ FFS: PDCCH in U-SS and/or PDCCH in C-SS
  RS used to derive SINR-like metric is down selected from following options
    ✧ Opt.1: CSI-RS
    ✧ Opt.2: DMRS for NR-PDCCH in C-SS
    ✧ Opt.3: DMRS for NR-PBCH
    ✧ Opt.4: NR-SSS
    ✧ Opt.5: RS for time/frequency tracking (if separate RS from above is defined for time/frequency tracking)
    ✧ FFS: how many options are used
  RAN1 assumes that single IS or OOS is indicated per reporting instance regardless number of beams available in cell. RAN1 has not concluded whether IS/OOS indications for RLF are per cell or not.
  RAN1 plans to provide at least periodic IS/OOS indications.
    FFS: possibility of additional aperiodic IS indication e.g., based on beam failure recovery mechanism.

Agreements:
  NR should strive to provide aperiodic indication(s) based on beam failure recovery procedure to assist radio link failure (RLF) procedure, if same RS is used for beam failure recovery and RLM procedures.
    Example 1: aperiodic indication(s) based on beam failure recovery procedure can reset/stop T310
      RAN2 can decide specific procedure
    Example 2: aperiodic indication(s) based on failure of beam recovery procedure
      How to use aperiodic indication can be decided in RAN2
    FFS: aperiodic indication(s) based on beam failure recovery procedure to assist RLF procedure if different RS is used
Agreements:
  NR studies reporting of SS block index, e.g., strongest SS block index, through Msg3 of contention based random access
  NR studies reporting of multiple SS block indices through Msg1 of contention free random access procedure
  e.g. network can assign multiple RACH transmission times and RACH preambles to the UE. UE can convey one SS block index by selecting a RACH transmission time and another SS block index implicitly by selecting a RACH preamble
Agreements:
  There is an initial active DL/UL bandwidth part pair to be valid for a UE until the UE is explicitly (re)configured with bandwidth part(s) during or after RRC connection is established
    The initial active DL/UL bandwidth part is confined within the UE minimum bandwidth for the given frequency band
    FFS: details of initial active DL/UL bandwidth part are discussed in initial access agenda
  Support activation/deactivation of DL and UL bandwidth part by explicit indication at least in (FFS: scheduling) DCI
    FFS: In addition, MAC CE based approach is supported
  Support activation/deactivation of DL bandwidth part by means of timer for a UE to switch its active DL bandwidth part to a default DL bandwidth part
    The default DL bandwidth part can be the initial active DL bandwidth part defined above
    FFS: The default DL bandwidth part can be reconfigured by the network
    FFS: detailed mechanism of timer-based solution (e.g. introducing a new timer or reusing DRX timer)
    FFS: other conditions to switch to default DL bandwidth part In NR, if a UE detects beam failure and/or finds a new candidate beam in a cell, the UE could initiate beam recovery procedure to re-establish the beam pair between UE and network (e.g. TRP (Transmission/Reception Point) or base station or cell). More specifically, the UE will need to transmit beam recovery request (BRQ) through PUCCH (Physical Random Access Channel) resource, PRACH (Physical Random Access Channel) resource, or PRACH-like resource. And the UE will start to monitor response (addressed to C-RNTI (Cell-Radio Network Temporary Identifier)) to the BRQ.

In BRQ transmitted through PUCCH resource, the beam recovery procedure could be modelled as (part of) SR procedure. The SR procedure for beam recovery purpose is to transmit beam recovery request through uplink control channel. The details of the behavior can refer to 3GPP RAN1 agreements.

Figure 5:
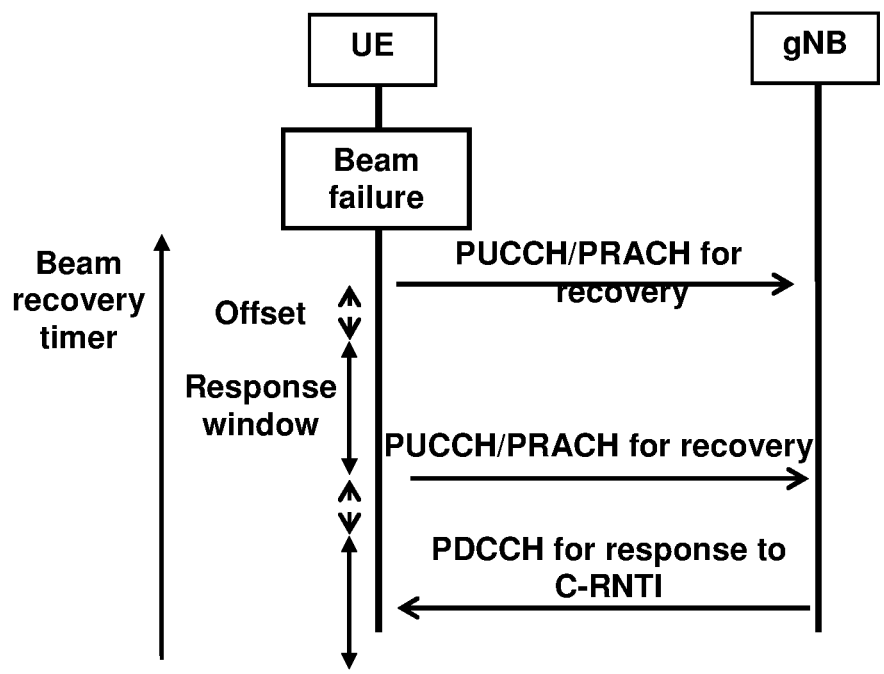
FIG. 5 illustrates a possible example of beam recovery procedure according to one exemplary embodiment.

In BRQ transmitted through PRACH resource, the beam recovery procedure could also be modelled as either random access procedure or SR procedure. If the BRQ transmission is modelled as random access procedure, the UE may perform steps shown in FIG. 5. In FIG. 5, a UE could transmit a beam recovery request (BRQ) through resource (dedicatedly) configured by network. The resource could be resource in the form of an uplink control channel (e.g. PUCCH or NR-PUCCH). The resource could be resource in the form of PRACH. After transmitting the BRQ, the UE may wait for an offset time and then start to monitor response for the BRQ within a window. If no response is received within the window, the UE would transmit another BRQ until corresponding response being received or a timer for controlling the beam recovery procedure expires. The offset time is a possible processing time for network to decode the BRQ and prepare response. The response is a PDCCH (Physical Downlink Control Channel) addressed to C-RNTI.

In one embodiment, the random access for BRQ could be a non-contention based random access procedure. Alternatively, the random access for BRQ could be a contention based random access procedure. Alternatively, the random access for BRQ could be either a contention based random access procedure or a non-contention based random access procedure. Whether the random access procedure is contention based or not depends on the PRACH resource used by the UE. More specifically, if the PRACH resource used by the UE is dedicatedly configured (for BRQ) by base station, the random access procedure could be non-contention based. Otherwise, if the PRACH resource used by the UE is provided through system information for UEs in the cell, the random access procedure would be contention based.

In either PUCCH case or PRACH case, the BRQ procedure may be interrupted by some events. Such interruption will cause extra delay or even accidental termination of BRQ procedure. Some possible interruptions are observed and discussed below:

Timing Alignment—

In general, the UE will need to apply uplink timing advance for any uplink transmission except PRACH transmission. The uplink timing advance is for aligning reception timing for transmissions from different UEs. As a result, the serious interference could be avoided. Moreover, in LTE, a timeAlignmentTimer is designed for UE to decide whether the uplink timing is still synchronized. If the timeAlignmentTimer expires, the UE would consider the uplink timing as asynchronization. And any uplink transmission based on the uplink timing will be stopped and corresponding configured (uplink) resource will be released. For example, the uplink SPS resource and PUCCH resource for scheduling request will be released by UE itself due to expiry of timeAlignmentTimer. In PUCCH for BRQ case, the UE will need to repeatedly transmit PUCCH for BRQ within a certain period before beam pair link is successfully recovered. And it is quite possible that the PUCCH transmission for BRQ is performed based on the uplink timing for preventing interference to other UE's transmission.

Since the UE cannot receive downlink transmission from the base station when beam failure occurs, the UE will not receive Timing Advance Command MAC (Medium Access Control) control element for re-starting the timeAlignmentTimer. As a result, the UE may need to deal with expiry of timeAlignmentTimer when the UE is performing beam recovery procedure. More specifically, in LTE design, PUCCH resources for scheduling request will be released in such condition.

For handling the condition (expiry of timeAlignmentTimer during an ongoing beam recovery procedure), the following methods are proposed:

Method 1—

The UE could release the PUCCH resource for BRQ if timeAlignmentTimer expires when UE is performing beam recovery procedure. In one embodiment, the UE could release the PUCCH resource for BRQ in such case, if the UE is configured with available PRACH resource for BRQ transmission. And the PRACH resource may be activated by base station for becoming available.

In one embodiment, the UE will trigger a procedure when timeAlignmentTimer expires and/or PUCCH resource for BRQ is released and/or monitoring window of last BRQ transmission is closed. The procedure could be a random access procedure or a beam recovery procedure. The procedure could also be non-contention based.

More specifically, the procedure could be performed based on PRACH resource for BRQ. And the procedure will be closed or completed by receiving C-RNTI scheduling (e.g. DL assignment or uplink grant) or by receiving a PDCCH addressed to C-RNTI. In one embodiment, if the PRACH resource for BRQ is configured and not activated, the UE can (autonomously) activate the PRACH resource when timeAlignmentTimer expires and/or PUCCH resource for BRQ is released and/or monitoring window of last BRQ transmission is closed. Alternatively, the procedure could be contention based.

On the other hand, a timer for controlling or overseeing beam recovery procedure may be still running when timeAlignmentTimer expires. Based on agreement, the UE will detect whether beam failure recovery fails when the timer for controlling or overseeing beam recovery procedure expires. How to handle the timer for controlling or overseeing beam recovery procedure could be a problem.

One possible way could be to stop the timer for controlling/overseeing beam recovery procedure. The reason is that the UE may trigger a contention based random access which is not considering as part of beam recovery procedure. The UE trigger the contention based random access due to having no PRACH resource for BRQ. In one embodiment, the MAC entity does not indicate beam recovery failure to higher layer even if the timer is stopped in this case.

Another possible way could be to keep the timer for controlling or overseeing beam recovery procedure running. The reason for keeping the timer running could be to prevent chain effect. More specifically, if the timer expires or be stopped, the UE may trigger radio link failure and/or RRC (Radio Resource Control) reestablishment procedure. In such case, the data loss will occur due to MAC reset, RLC (Radio Link Control) reestablishment, and/or PDCP (Packet Data Convergence Protocol) reestablishment.

Method 2—

This method is trying to prevent occurrence of such condition. One possible way could be to suspend timeAlignmentTimer when UE is performing beam recovery procedure. Another possible way could be to not consider timeAlignmentTimer expiry when the UE is performing beam recovery procedure. An additional possible way could be to not release PUCCH resource (for BRQ) when the UE is performing beam recovery procedure. This way at least the beam recovery request procedure will not be terminated accidentally.

Method 3—

Another possible way could be to use downlink timing as reference for BRQ transmission via PUCCH.

Method 4—

Another possible way could be network implementation. In detail, the base station could always refresh the timeAlignmentTimer by transmitting Timing Advance Command MAC control element to the UE before remaining time of timeAlignmentTimer becomes less than the length of the timer for controlling or overseeing beam recovery procedure. The UE will detect beam recovery failure when the timer for controlling or overseeing beam recovery procedure expires.

Measurement Gap—

On the other hand, measurement gap in LTE is introduced for the UE to perform inter-frequency measurement and/or inter-rat measurement. In detail, the inter-frequency measurement or inter-rat measurement will need the UE to retune the transceiver for different frequencies. And transmission and reception may not work before the transceiver is retuned back to serving frequency. The measurement gap is to align the understanding between UE and base station for suspending scheduling.

Following LTE design, considering mobility, the UE will prioritize the measurement gap over uplink transmission (i.e. PUCCH transmission and PUSCH transmission). And the UE may also prioritize the measurement gap over the PRACH transmission. In LTE, the measurement gap could occur every 40 ms and last for 3 ms. If PRACH resource for BRQ or PUCCH resource for BRQ is skipped due to measurement gap, the beam recovery procedure would be prolonged. Moreover, the monitoring period after transmitting BRQ could also collide with measurement gap.

Some enhancements for this case are proposed as follows:

Enhancement 1—

A UE would prioritize the transmission for BRQ over the measurement gap. In one embodiment, the UE would not consider the measurement gap when UE decides the available resource for BRQ transmission. In one embodiment, the UE could select PUCCH resource or PRACH resource for BRQ transmission regardless of whether the PUCCH resource will collide with measurement gap. In addition, the UE could keep monitoring the response for BRQ regardless whether monitoring period or monitoring window collides with measurement gap after transmitting the BRQ.

Enhancement 2—

A UE would prioritize the transmission for BRQ over the measurement gap based on a configuration. In one embodiment, if the UE is configured to prioritize the transmission for BRQ, the UE would not consider the measurement gap when UE decides the available resource for BRQ transmission. In one embodiment, if the UE is configured to prioritize the transmission for BRQ, the UE could select PUCCH resource or PRACH resource for BRQ transmission regardless whether the PUCCH resource will collide with measurement gap. If the UE is configured to prioritize the beam recovery procedure, the UE could keep monitoring the response for BRQ regardless whether monitoring period or monitoring window collides with measurement gap after transmitting the BRQ.

In one embodiment, the configuration could be a beam recovery related configuration. Alternatively, the configuration could be a measurement gap related configuration. Alternatively, the configuration could include an indication or an information element indicating the prioritization.

Enhancement 3—

The UE would prioritize monitoring the response for BRQ over the measurement gap, but would not prioritize BRQ transmission over the measurement gap.

Enhancement 4—

The UE would prioritize BRQ transmission over the measurement gap, but would not prioritize monitoring the response for BRQ over the measurement gap.

Enhancement 5—

For power saving, if the measurement gap is prioritized over beam recovery procedure, the UE would need to take measurement gap into account for deciding whether resource is available for transmission. More specifically, the UE would exclude the (PUCCH or PRACH) resource which collides with measurement gap. And the UE may also exclude the (PUCCH or PRACH) resource whose corresponding monitoring window collides with measurement gap.

Figure 6:
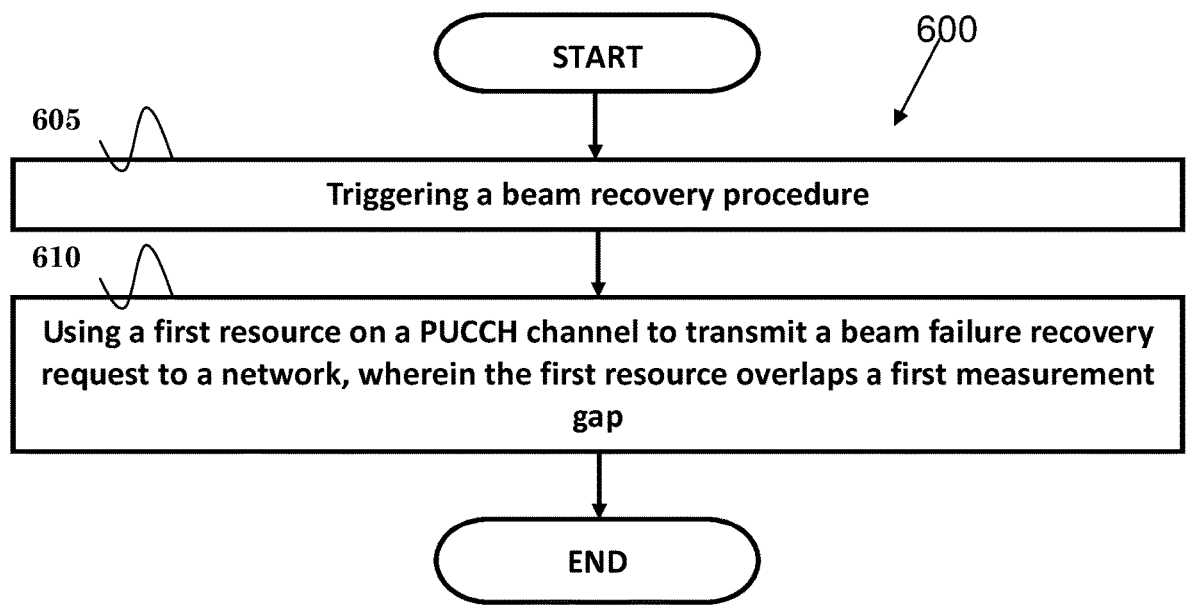
FIG. 6 is a flow chart according to one embodiment.

FIG. 6 is a flow chart 600 according to one exemplary embodiment from the perspective of a UE. In step 605, the UE triggers a beam recovery procedure. In step 610, the UE uses a first resource on a PUCCH channel to transmit a beam failure recovery request to a network, wherein the first resource overlaps a first measurement gap.

In one embodiment, the UE does not use a second resource on the PUCCH channel to transmit a scheduling request if the second resource overlaps a second measurement gap. The second resource could be configured by the network. The second measurement gap could be determined based on a second configuration received from the network. The scheduling request could be triggered by uplink data arrival.

In one embodiment, the first measurement gap could be determined based on a first configuration received from the network. The first resource could be configured by the network. The UE could receive a response for the beam failure recovery request within a third measurement gap.

In one embodiment, the UE does not use a third resource on the channel to transmit a preamble if the third resource overlaps a third measurement gap. The first measurement gap, the second measurement gap, and the third measurement gap could be determined based on same or different configuration(s) received from the network. In one embodiment, the first resource, the second resource, and the third resource could be configured by the network.

Referring back to FIGS. 3 and 4, in one exemplary embodiment of a UE, the device 300 includes a program code 312 stored in the memory 310. The CPU 308 could execute program code 312 to enable the UE (i) to trigger a beam recovery procedure, and (ii) to use a first resource on a PUCCH channel to transmit a beam failure recovery request to a network, wherein the first resource overlaps a first measurement gap. Furthermore, the CPU 308 can execute the program code 312 to perform all of the above-described actions and steps or others described herein.

Figure 7:
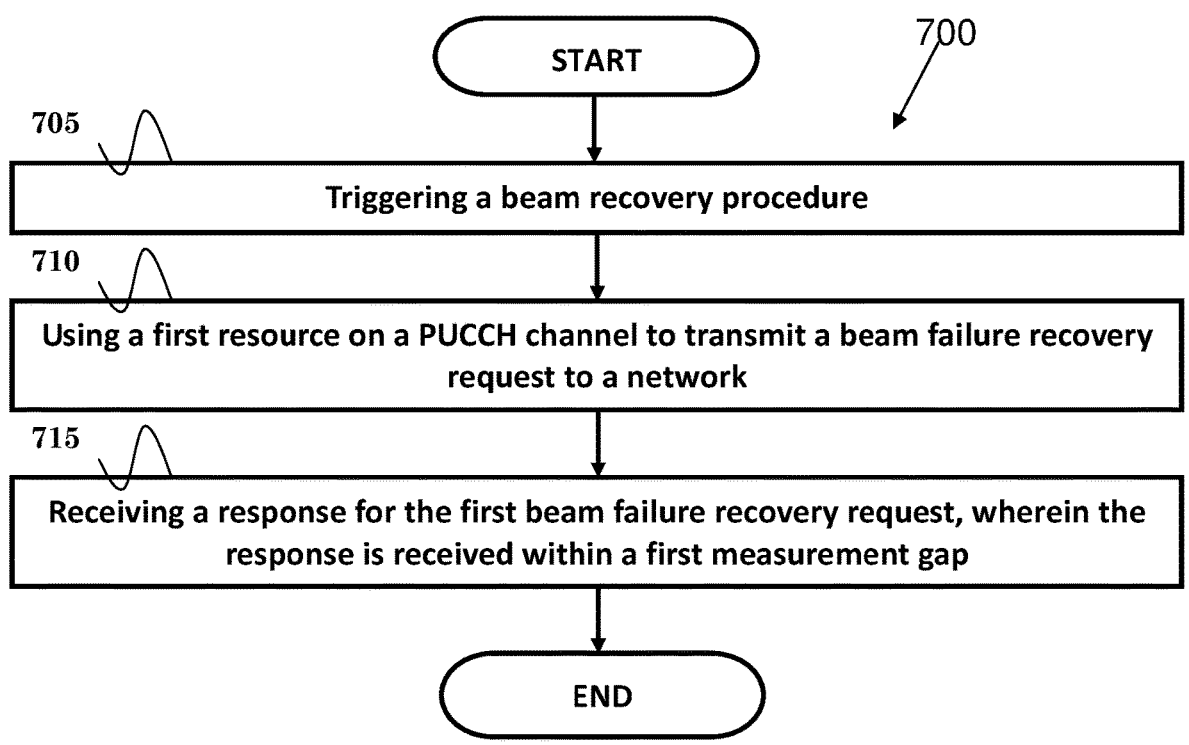
FIG. 7 is a flow chart according to one exemplary embodiment.

FIG. 7 is a flow chart 700 according to one exemplary embodiment from the perspective of a UE. In step 705, the UE triggers a beam failure recovery procedure. In step 710, the UE uses a first resource on a PUCCH channel to transmit a first beam failure recovery request to a network. In step 715, the UE receives a response for the first beam failure recovery request, wherein the response is received within a first measurement gap.

In one embodiment, the response could be a downlink control information (DCI) addressed to C-RNTI of the UE. The first measurement gap could be determined based on a first configuration received from the network. The first resource could be configured by the network.

In one embodiment, the UE does not use a second resource on the PUCCH channel to transmit a second beam recovery request to the network if the second resource overlaps a second measurement gap. The second resource could be configured by the network. The second measurement gap could be determined based on a second configuration received from the network. Alternatively, the second measurement gap could be determined based on the first configuration.

In one embodiment, the network could be a base station or a gNB. The UE could be served by single cell, by multiple cells in carrier aggregation, or by multiple cells in multiple connectivities.

Referring back to FIGS. 3 and 4, in one exemplary embodiment of a UE, the device 300 includes a program code 312 stored in the memory 310. The CPU 308 could execute program code 312 to enable the UE (i) to trigger a beam recovery procedure, (ii) to use a first resource on a PUCCH channel to transmit a beam failure recovery request to a network, and (iii) to receive a response for the first beam failure recovery request, wherein the response is received within a first measurement gap. Furthermore, the CPU 308 can execute the program code 312 to perform all of the above-described actions and steps or others described herein.

Figure 8:
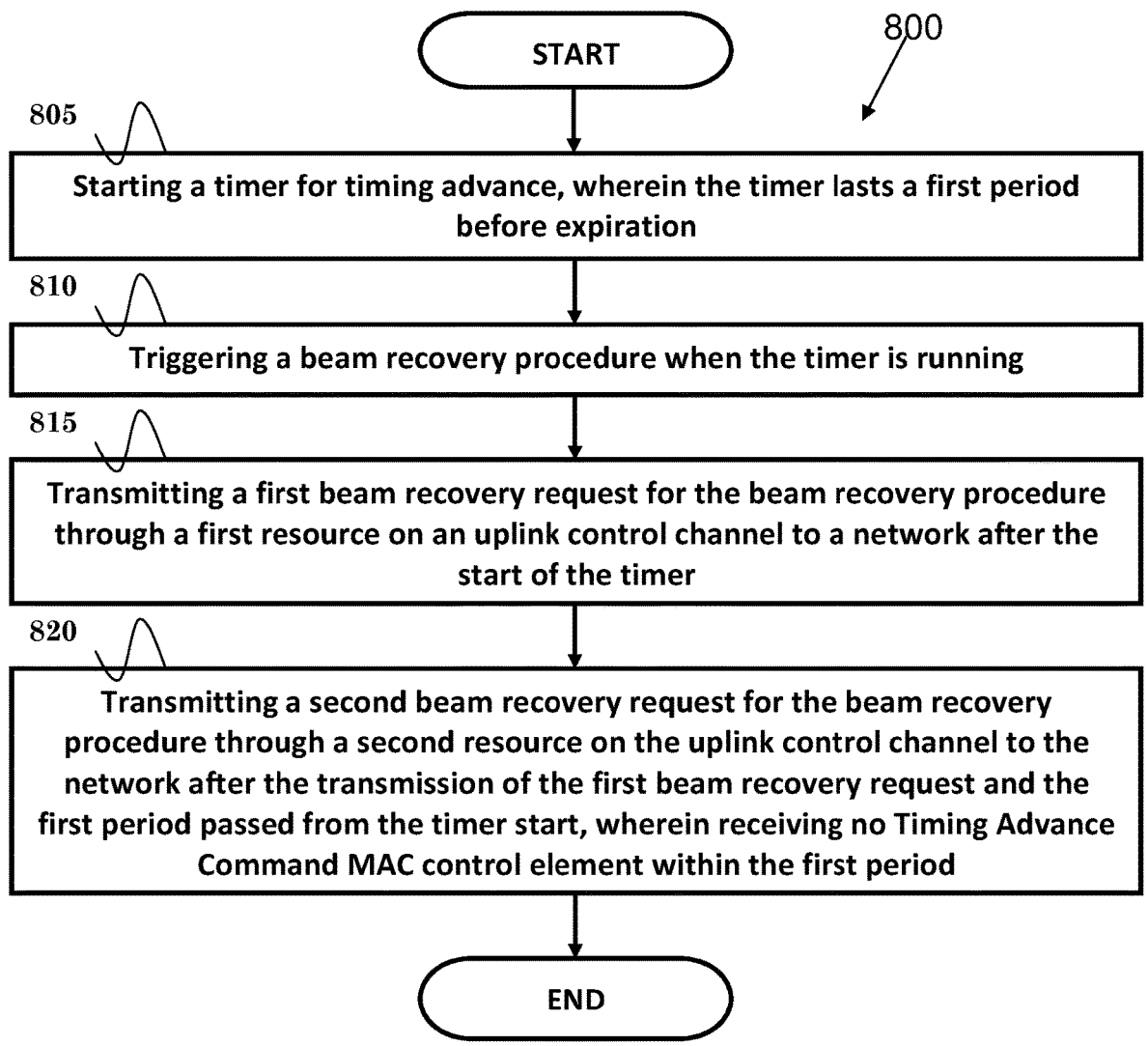
FIG. 8 is a flow chart according to one exemplary embodiment.

FIG. 8 is a flow chart 800 according to one exemplary embodiment from the perspective of a UE. In step 805, the UE starts a timer for timing advance, wherein the timer lasts a first period before expiration. In step 810, the UE triggers a beam recovery procedure when the timer is running. In step 815, the UE transmits a first beam recovery request for the beam recovery procedure through a first resource on an uplink control channel to a network after the start of the timer. In step 820, the UE transmits a second beam recovery request for the beam recovery procedure through a second resource on the uplink control channel to the network after the transmission of the first beam recovery request and the first period passed from the timer start, wherein receiving no Timing Advance Command MAC control element within the first period.

In one embodiment, the timer could be suspended when the beam recovery procedure is triggered. The timer may not be considered expired when the second beam recovery request is transmitted.

In one embodiment, the uplink control channel could be PUCCH or NR-PUCCH. The first period could be configured by the network. The first beam recovery request could include information of a first candidate beam. The second beam recovery request could include the information of the first candidate beam and/or information of a second candidate beam. Furthermore, the information of the first candidate beam and the information of the second candidate beam could be information related to synchronization signal (SS) block.

Referring back to FIGS. 3 and 4, in one exemplary embodiment of a UE, the device 300 includes a program code 312 stored in the memory 310. The CPU 308 could execute program code 312 to enable the UE (i) to start a timer for timing advance, wherein the timer lasts a first period before expiration, (ii) to trigger a beam recovery procedure when the timer is running, (iii) to transmit a first beam recovery request for the beam recovery procedure through a first resource on an uplink control channel to a network after the start of the timer, and (iv) to transmit a second beam recovery request for the beam recovery procedure through a second resource on the uplink control channel to the network after the transmission of the first beam recovery request and the first period passed from the timer start, wherein receiving no Timing Advance Command MAC control element within the first period. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a UE (User Equipment), comprising:
triggering a beam failure recovery procedure;
using a first resource on a PUCCH (Physical Uplink Control Channel) channel to transmit a first beam failure recovery request to a network; and
monitoring and/or receiving a response for the first beam failure recovery request within a first measurement gap, wherein the first measurement gap is a time gap where the UE performs inter-frequency measurement and/or inter-RAT (inter-Radio Access Technology) measurement to facilitate transceiver retuning for different frequencies, and the monitoring and/or receiving of the response is prioritized over beam recovery request transmissions, and the first resource on the PUCCH channel colliding with the first measurement gap is excluded, during the first measurement gap.

2. The method of claim 1, wherein the response is a downlink control information addressed to a C-RNTI (Cell-Radio Network Temporary Identifier) of the UE.

3. The method of claim 1, wherein the first measurement gap is determined based on a first configuration received from the network.

4. The method of claim 1, wherein the first resource is configured by the network.

5. The method of claim 1, further comprising:
the UE does not use a second resource on the PUCCH channel to transmit a second beam recovery request to the network if the second resource overlaps a second measurement gap.

6. The method of claim 5, wherein the second resource is configured by the network.

7. The method of claim 5, wherein the second measurement gap is determined based on a second configuration received from the network.

8. The method of claim 1, wherein the network is a base station or a gNB.

9. The method of claim 1, wherein the UE is served by single cell.

10. The method of claim 1, wherein the UE is served by multiple cells in carrier aggregation.

11. The method of claim 1, wherein the UE is served by multiple cells in multiple connectivities.

12. A method of a UE (User Equipment), comprising:
triggering a beam recovery procedure; and
using a first resource on a PUCCH (Physical Uplink Control Channel) channel to transmit a beam failure recovery request to a network, wherein the first resource overlaps a first measurement gap, and wherein the first measurement gap is a time gap where the UE performs inter-frequency measurement and/or inter-RAT (inter-Radio Access Technology) measurement to facilitate transceiver retuning for different frequencies, and wherein the first resource of the PUCCH channel colliding with the first measurement gap is excluded.

13. The method of claim 12, further comprising:
the UE does not use a second resource on the PUCCH channel to transmit a scheduling request if the second resource overlaps a second measurement gap.

14. The method of claim 13, wherein the second resource is configured by the network.

15. The method of claim 13, wherein the second measurement gap is determined based on a second configuration received from the network.

16. The method of claim 12, wherein the first measurement gap is determined based on a first configuration received from the network.

17. The method of claim 12, wherein the first resource is configured by the network.

18. The method of claim 12, further comprising:
the UE receives a response for the beam failure recovery request within a third measurement gap.

19. A User Equipment (UE), comprising:
a processor; and
a memory operatively coupled to the processor, wherein the processor is configured to execute a program code to:
trigger a beam failure recovery procedure;
use a first resource on a PUCCH (Physical Uplink Control Channel) channel to transmit a first beam failure recovery request to a network; and
monitor and/or receive a response for the first beam failure recovery request within a first measurement gap, wherein the first measurement gap is a time gap where the UE performs inter-frequency measurement and/or inter-RAT (inter-Radio Access Technology) measurement to facilitate transceiver retuning for different frequencies, and monitoring and/or receiving of the response is prioritized over beam recovery transmissions, and the first resource on the PUCCH channel colliding with the first measurement gap is excluded, during the first measurement gap.

20. The UE of claim 19, wherein the response is a downlink control information addressed to C-RNTI (Cell-Radio Network Temporary Identifier) of the UE.

* * * * *